United States Patent
Lewis

(10) Patent No.: US 11,034,403 B2
(45) Date of Patent: Jun. 15, 2021

(54) DRIVE SYSTEM

(71) Applicant: Mark Zeb Lewis, Union, OR (US)

(72) Inventor: Mark Zeb Lewis, Union, OR (US)

(*) Notice: Subject to any disclaimer, the term of this patent is extended or adjusted under 35 U.S.C. 154(b) by 214 days.

(21) Appl. No.: 16/524,034

(22) Filed: Jul. 27, 2019

(65) Prior Publication Data
US 2019/0344854 A1 Nov. 14, 2019

Related U.S. Application Data

(63) Continuation-in-part of application No. 15/731,468, filed on Jun. 14, 2017, now Pat. No. 10,407,124.

(51) Int. Cl.
| | |
|---|---|
| *B62K 3/00* | (2006.01) |
| *B62M 1/28* | (2013.01) |
| *B62M 9/02* | (2006.01) |
| *B62M 9/00* | (2006.01) |

(52) U.S. Cl.
CPC ............. *B62K 3/002* (2013.01); *B62M 1/28* (2013.01); *B62M 9/02* (2013.01); *B62M 2009/005* (2013.01)

(58) Field of Classification Search
CPC .......... B62K 3/002; B62M 1/24; B62M 1/26; B62M 1/28; B62M 2009/005; B62M 9/02
See application file for complete search history.

(56) References Cited

U.S. PATENT DOCUMENTS

| | | | | | |
|---|---|---|---|---|---|
| 1,800,123 | A | * | 4/1931 | Wagen | B62M 1/36 280/221 |
| 5,775,708 | A | * | 7/1998 | Heath | B62K 21/00 280/224 |
| 6,648,353 | B1 | * | 11/2003 | Cabal | B62K 3/002 280/220 |
| 7,717,446 | B2 | * | 5/2010 | Pate | B62M 1/26 280/221 |
| 7,803,090 | B2 | * | 9/2010 | Kraus | B62M 1/12 482/62 |
| 7,967,313 | B1 | * | 6/2011 | Eggert | B62M 1/26 280/224 |
| 8,162,337 | B2 | * | 4/2012 | Teal | B62K 3/002 280/221 |
| 8,210,553 | B2 | * | 7/2012 | Fan | B62K 3/002 280/221 |
| 9,475,543 | B1 | * | 10/2016 | Chou | B62M 9/02 |
| 9,975,600 | B2 | * | 5/2018 | Chou | B62K 21/12 |
| 2003/0030245 | A1 | * | 2/2003 | Janssen | B62K 3/002 280/259 |
| 2003/0047902 | A1 | * | 3/2003 | Miller | B62M 1/26 280/253 |

(Continued)

*Primary Examiner* — Michael McCullough
(74) *Attorney, Agent, or Firm* — Chen-Chi Lin

(57) ABSTRACT

A drive system comprises a frame, a first extension member, a second extension member, a crank shaft, a hub, a bearing, a cross shaft, a first arm assembly, a second arm assembly, a first chain assembly, a second chain assembly, a first rotatable pedal, a second rotatable pedal, and a steering column. The first arm assembly comprises a first frame arm, a first connecting arm, a first main arm, and a first crank arm. The second arm assembly comprises a second frame arm, a second connecting arm, a second main arm, and a second crank arm. The first arm assembly further comprises a first roller track assembly. The second arm assembly further comprises a second roller track assembly.

12 Claims, 9 Drawing Sheets

(56) References Cited

U.S. PATENT DOCUMENTS

| | | | |
|---|---|---|---|
| 2007/0001422 A1* | 1/2007 | Kraus | A63B 22/0664 |
| | | | 280/200 |
| 2007/0024019 A1* | 2/2007 | Tarlow | B62K 3/002 |
| | | | 280/221 |
| 2007/0235974 A1* | 10/2007 | Vargas | B62M 1/26 |
| | | | 280/256 |
| 2008/0116655 A1* | 5/2008 | Pate | B62K 3/002 |
| | | | 280/221 |
| 2012/0048059 A1* | 3/2012 | Sun | B62K 3/002 |
| | | | 74/594.4 |
| 2020/0407014 A1* | 12/2020 | Chou | B62K 11/14 |

* cited by examiner

DRIVE SYSTEM

CROSS-REFERENCE TO RELATED APPLICATIONS

This Patent is a Continuation-in-Part Application of a Non-provisional patent application Ser. No. 15/731,468 filed on Jun. 14, 2017. The Disclosure made in the Non-Provisional patent application Ser. No. 15/731,468 is hereby incorporated by reference.

FIELD OF THE INVENTION

This invention relates generally to a drive system. More particularly, the present invention relates to a drive system comprising two arm assemblies and two chain assemblies.

BACKGROUND OF THE INVENTION

U.S. patent application Ser. No. 15/731,468 discloses an elliptical drive system without chains. The present disclosure discloses a drive system with two chain assemblies.

A quadrilateral linkage of a first arm assembly and a quadrilateral linkage of a second arm assembly minimize vertical motions of user's feet while guiding the user's feet in natural, elliptical motions that resemble a walking process.

The drive system of the present disclosure may be applied to human powered devices. Examples of human powered devices include, but not limited to, bicycles, wheeled vehicles, and watercrafts.

SUMMARY OF THE INVENTION

A drive system comprises a frame, a first extension member, a second extension member, a crank shaft, a hub, a bearing, a cross shaft, a first arm assembly, a second arm assembly, a first chain assembly, a second chain assembly, a first rotatable pedal, a second rotatable pedal, and a steering column.

The first arm assembly comprises a first frame arm, a first connecting arm, a first main arm, and a first crank arm. The second arm assembly comprises a second frame arm, a second connecting arm, a second main arm, and a second crank arm. The first arm assembly further comprises a first roller track assembly. The second arm assembly further comprises a second roller track assembly.

A left foot of a rider steps on the first rotatable pedal. A right foot of a rider steps on the second rotatable pedal. Motion of the first rotatable pedal drives the first arm assembly. Motion of the second rotatable pedal drives the second arm assembly. Motion of the first arm assembly and motion of the second arm assembly drive the first chain assembly. Motion of the first chain assembly drives the second chain assembly.

DETAILED DESCRIPTION OF THE INVENTION

Figure 1:
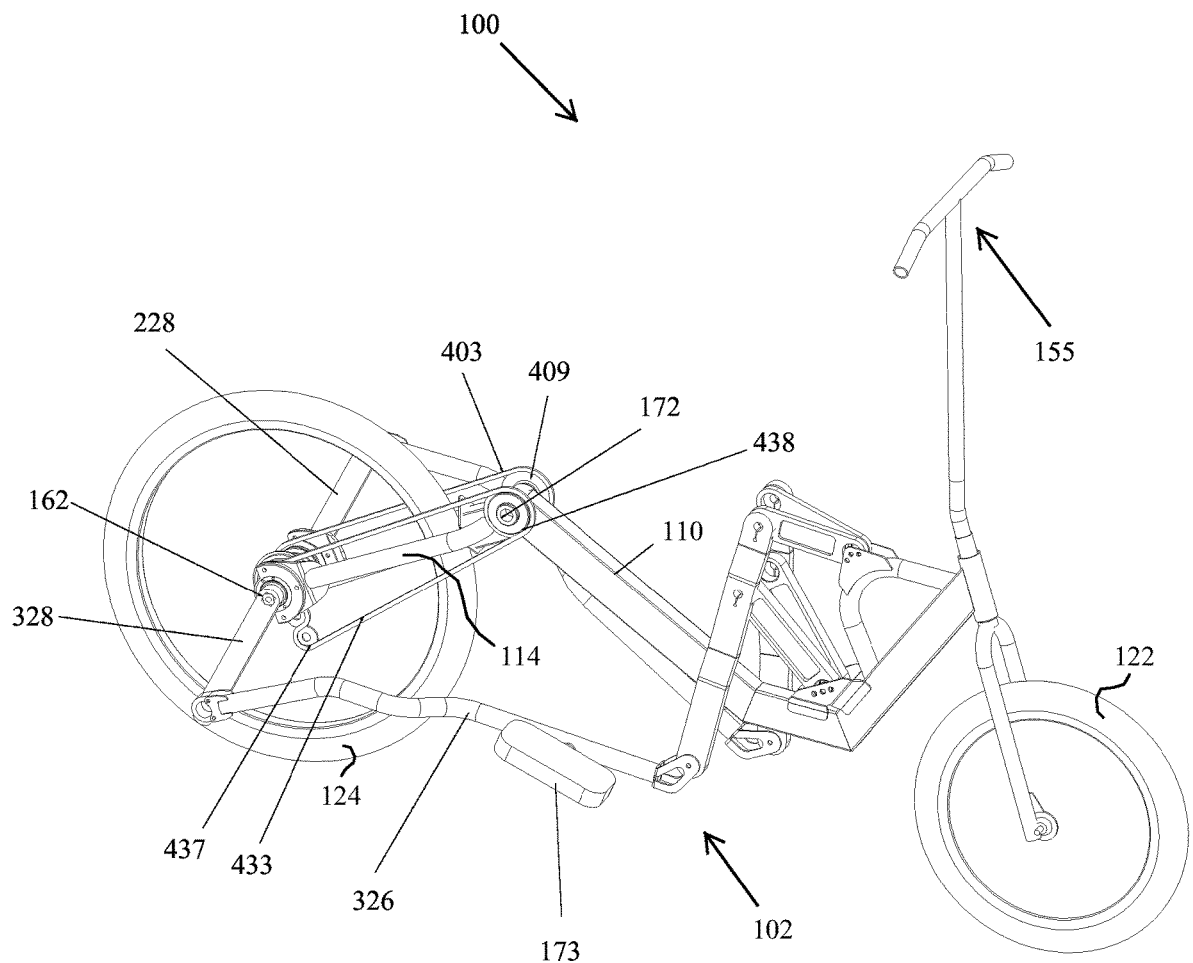
FIG. 1 is a perspective view of a bicycle including a drive system in examples of the present disclosure.
Figure 2:
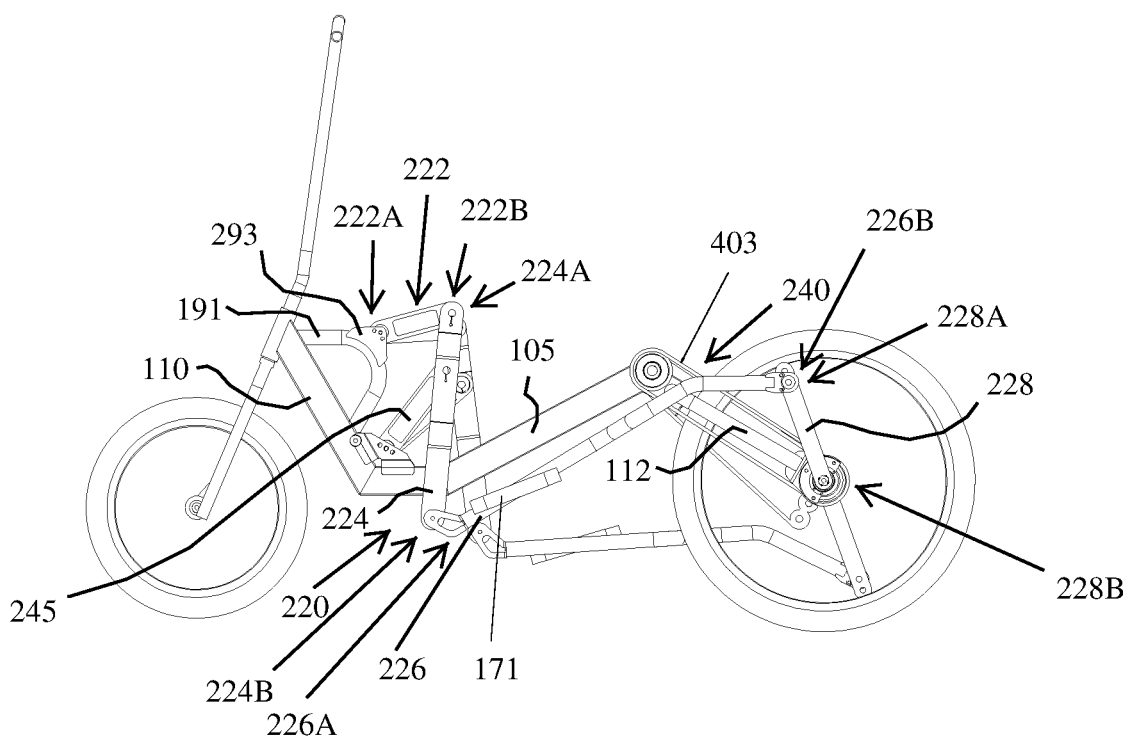
FIG. 2 is a left side view of the bicycle of FIG. 1.
Figure 3:
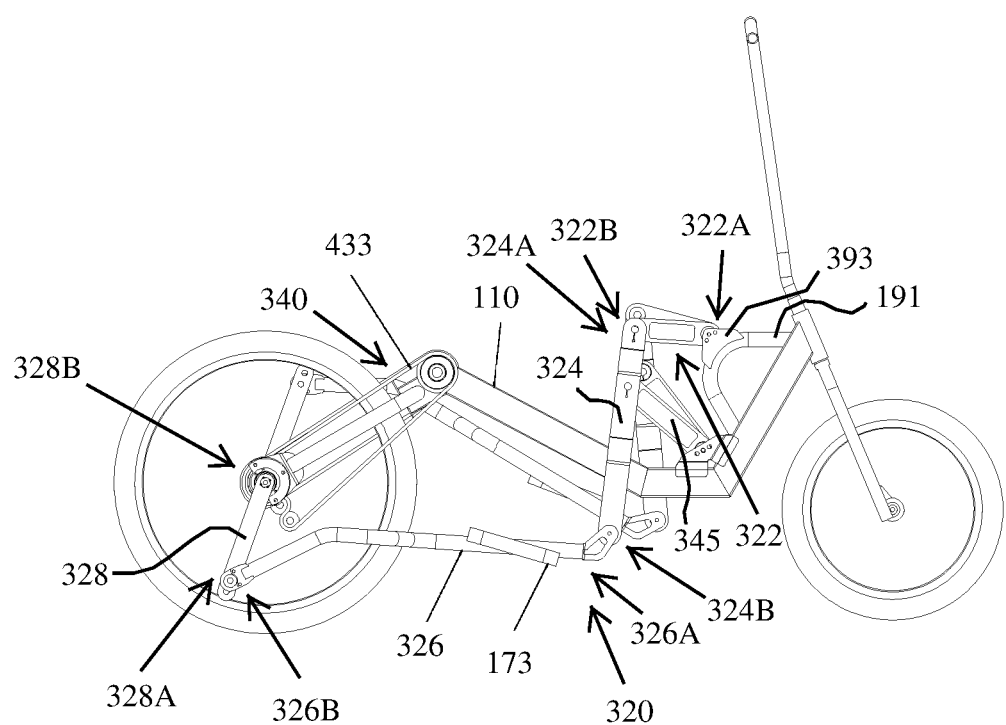
FIG. 3 is a right side view of the bicycle of FIG. 1.
Figure 4:
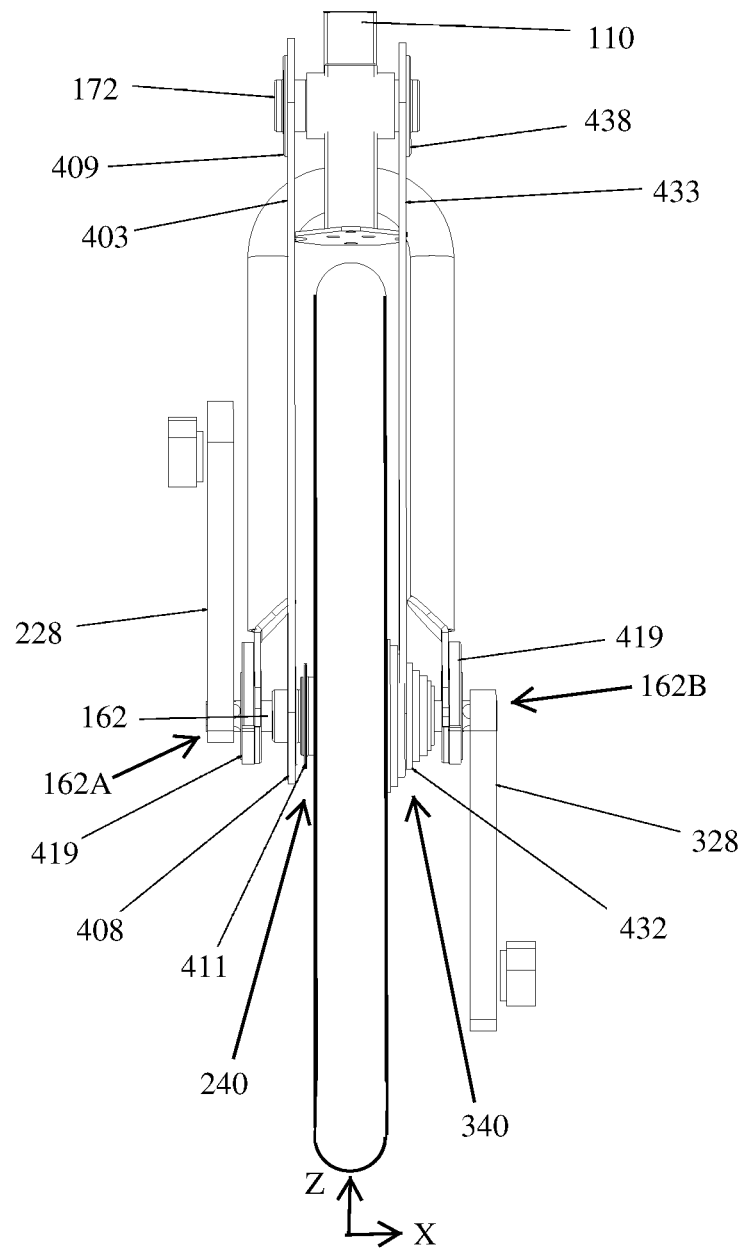
FIG. 4 is a partial, angled back view of the bicycle of FIG. 1.
Figure 5:
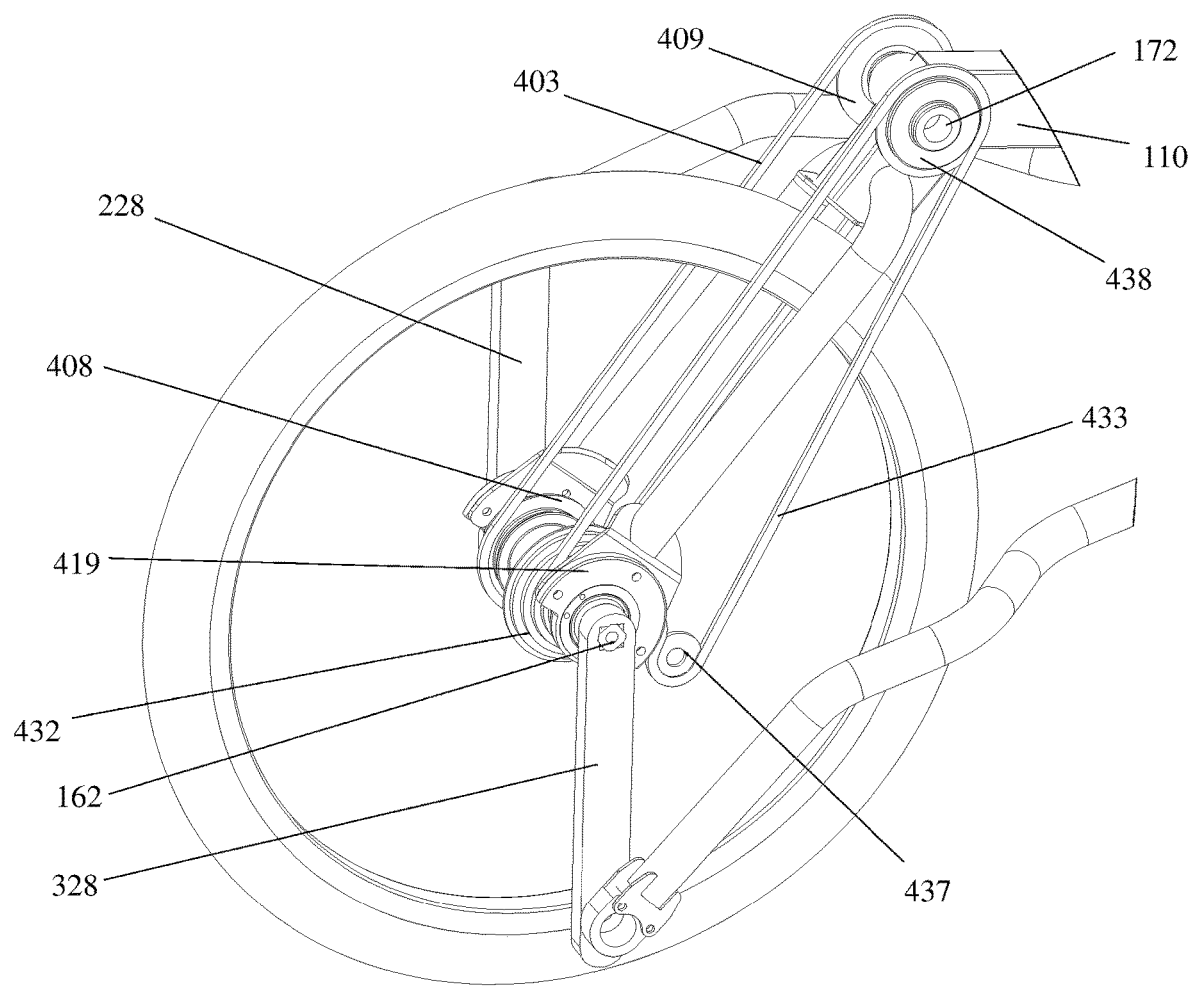
FIG. 5 is a partial, perspective view of the bicycle of FIG. 1.

FIG. 1 is a perspective view of a bicycle 100 including a drive system 102 in examples of the present disclosure. FIG. 2 is a left side view of the bicycle 100. FIG. 3 is a right side view of the bicycle 100. FIG. 4 is a partial, angled rear view of the bicycle 100. FIG. 5 is a partial, perspective view of the bicycle 100. The bicycle 100 further comprises a front wheel 122 and a rear wheel 124. The drive system 102 comprises a frame 110, a first extension member 112 of FIG. 2, a second extension member 114, a crank shaft 162, a hub 411 of FIG. 4, a bearing 419 of FIG. 4, a cross shaft 172, a first arm assembly 220 of FIG. 2, a second arm assembly 320 of FIG. 3, a first chain assembly 240 of FIG. 2, a second chain assembly 340 of FIG. 3, a first pedal 171, a second pedal 173, and a steering column 155. The first extension member 112 is attached to the frame 110. The second extension member 114 is attached to the frame 110. The bearing 419 allows rotation of the crank shaft 162 between the first extension member 112 and the second extension member 114. The hub 411 is rotatably attached to the crank shaft 162. The cross shaft 172 is rotatably attached to the frame 110. The first pedal 171 is rotatably attached to the first main arm 226. The second pedal 173 is rotatably attached to the second main arm 326. The steering column 155 is rotatably attached to the frame 110.

In one example, the first arm assembly 220 is disposed on a first side (left side) of the frame 110. The second arm assembly 320 is disposed on a second side (right side) of the frame 110. The second side (right side) of the frame is opposite to the first side (left side) of the frame. The first chain assembly 240 is disposed on the first side (left side) of the frame. The second chain assembly 340 is disposed on the second side (right side) of the frame.

Figure 6:
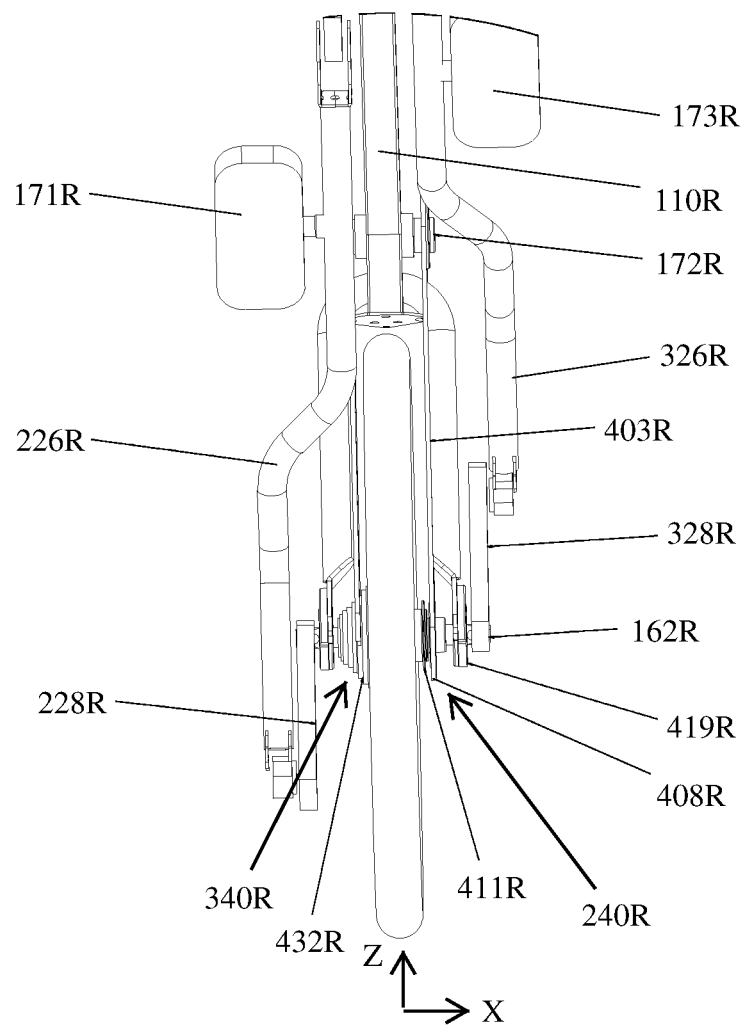
FIG. 6 is a partial, angled back view of another bicycle in examples of the present disclosure.

In another example, referring now to FIG. 6, the first chain assembly 240R is disposed on the second side (right side) of the frame. The second chain assembly 340R is disposed on the first side (left side) of the frame. In examples of the present disclosure, the first chain assembly 240R of FIG. 6 is a mirror image of the first chain assembly 240 of FIG. 4 with respect to the XZ plane. The second chain assembly 340R of FIG. 6 is a mirror image of the second chain assembly 340 of FIG. 4 with respect to the XZ plane.

Referring now to FIG. 2, the first arm assembly 220 comprises a first frame arm 222, a first connecting arm 224, a first main arm 226, and a first crank arm 228. A first end 222A of the first frame arm 222 is rotatably attached to a first panel 293 of a V-shape member 191 of the frame 110. A first end 224A of the first connecting arm 224 is rotatably attached to a second end 222B of the first frame arm 222. A first end 226A of the first main arm 226 is rotatably attached to a second end 224B of the first connecting arm 224. A first end 228A of the first crank arm 228 is rotatably attached to a second end 226B of the first main arm 226.

Referring now to FIG. 3, the second arm assembly 320 comprises a second frame arm 322, a second connecting arm 324, a second main arm 326, and a second crank arm 328.

A first end 322A of the second frame arm 322 is rotatably attached to a second panel 393 of a V-shape member 191 of the frame 110. A first end 324A of the second connecting arm 324 is rotatably attached to a second end 322B of the second frame arm 322. A first end 326A of the second main arm 326 is rotatably attached to a second end 324B of the second connecting arm 324. A first end 328A of the second crank arm 328 is rotatably attached to a second end 326B of the second main arm 326.

In examples of the present disclosure, referring now to FIGS. 2 and 4, the first chain assembly 240 comprises a first drive sprocket 408, a first chain 403, and a first driven sprocket 409. The first drive sprocket 408 is rigidly attached to the crank shaft 162. The first chain 403 is driven by the first drive sprocket 408. The first driven sprocket 409 is driven by the first chain 403. The first driven sprocket 409 is rigidly attached to the cross shaft 172.

In examples of the present disclosure, referring now to FIGS. 3, 4 and 5, the second chain assembly 340 comprises a second drive sprocket 438, a second chain 433, a cluster 432 and a chain derailleur 437. The cluster 432 has a ratchet mechanism to allow free wheel coasting of rear wheel 124 and hub 411. In one example, the cluster 432 is a conventional bicycle cluster. In one example, the chain derailleur 437 is a conventional bicycle chain derailleur. The second drive sprocket 438 is rigidly attached to the cross shaft 172. The first driven sprocket 409 drives the cross shaft 172 and the second drive sprocket 438. The second chain 433 is driven by the second drive sprocket 438. The cluster 432 is mounted to the second extension member 114. The cluster 432 is driven by the second chain 433. The cluster 432 drives the hub 411. The chain derailleur 437 mounted to the second extension member 114.

Referring now to FIGS. 2, 3 and 4, a second end 228B of the first crank arm 228 is rigidly attached to a first end 162A of the crank shaft 162. A second end 328B of the second crank arm 328 is rigidly attached to a second end 162B of the crank shaft 162. The first crank arm 228 and the second crank arm 328 drive the crank shaft 162 and the first drive sprocket 408.

Referring now to FIGS. 1-5, in examples of the present disclosure, a left foot of a rider steps on the first pedal 171. A right foot of a rider steps on the second pedal 173. Motion of the first pedal 171 drives the first arm assembly 220. Motion of the second pedal 173 drives the second arm assembly 320. Motion of the first arm assembly 220 and motion of the second arm assembly 320 drive the first chain assembly 240. Motion of the first chain assembly 240 drives the second chain assembly 340.

Motion of the first crank arm 228 and motion of the second crank arm 328 drive the crank shaft 162 and the first drive sprocket 408. Motion of the first drive sprocket 408 drives the first chain 403. Motion of the first chain 403 drives the first driven sprocket 409. Motion of the first driven sprocket 409 drives the cross shaft 172 and the second drive sprocket 438. Motion of the second drive sprocket 438 drives the second chain 433. Motion of the second chain 433 drives the cluster 432. Motion of the cluster 432 drives the hub 411.

Referring now to FIGS. 2 and 3, the first arm assembly 220 further comprises a first track arm 245 connecting the first connecting arm 224 to the frame 110. The second arm assembly 320 further comprises a second track arm 345 connecting the second connecting arm 324 to the frame 110.

Referring now to FIGS. 2 and 3, in examples of the present disclosure, the frame 110 comprises a main body 105, a V-shape member 191, a first panel 293, and a second panel 393. The V-shape member 191 is attached to the main body 105. The first panel 293 is attached to the V-shape member 191. The second panel 393 is attached to the V-shape member 191. The first end 222A of the first frame arm 222 is rotatably attached to the first panel 293 of the frame 110. The first end 322A of the second frame arm 322 is rotatably attached to the second panel 393 of the frame 110.

Figure 7:
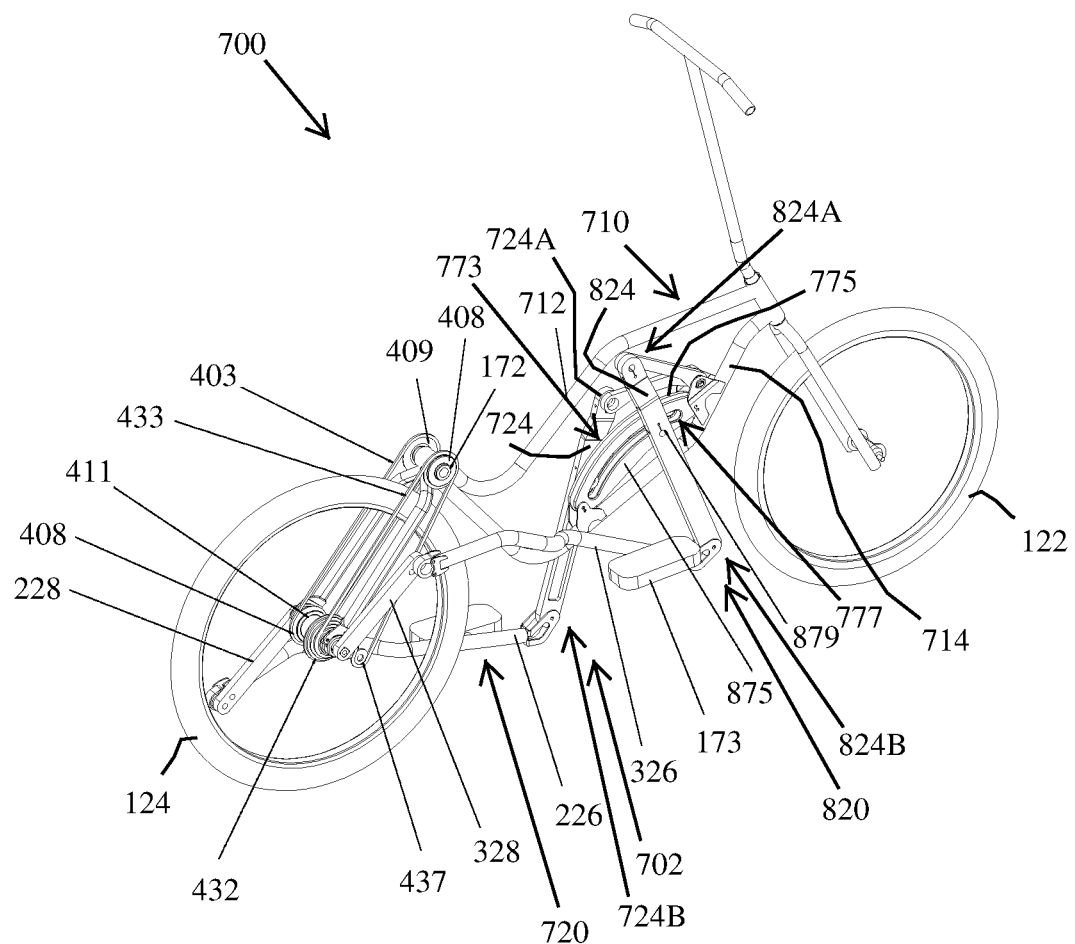
FIG. 7 is a perspective view of still another bicycle in examples of the present disclosure.
Figure 8:
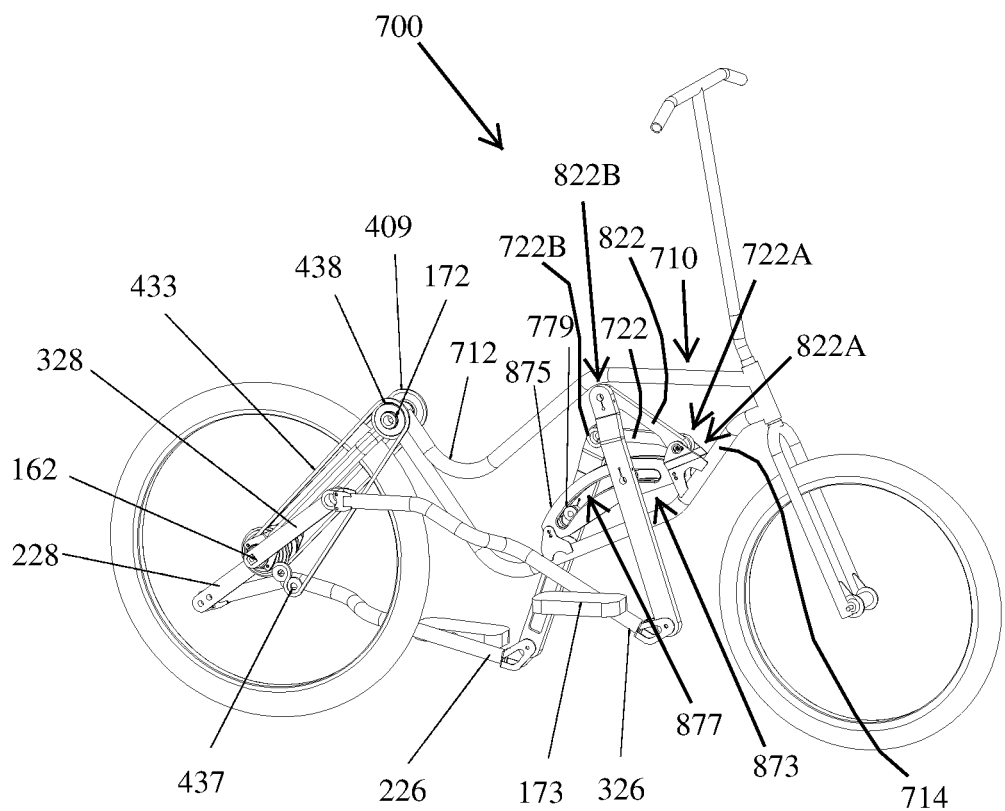
FIG. 8 is a right side view of the bicycle of FIG. 7.

FIG. 7 is a perspective view of a bicycle 700 including a drive system 702 in examples of the present disclosure. FIG. 8 is a right side view of the bicycle 700 of FIG. 7. The bicycle 700 further comprises a front wheel 122 and a rear wheel 124. The drive system 702 comprises a frame 710, a first extension member 112 of FIG. 2, a second extension member 114 of FIG. 1, a crank shaft 162 of FIG. 1, a hub 411 of FIG. 4, a bearing 419 of FIG. 4, a cross shaft 172, a first arm assembly 720 of FIG. 7, a second arm assembly 820 of FIG. 7, a first chain assembly 240 of FIG. 2, a second chain assembly 340 of FIG. 3, a first pedal 171 of FIG. 2, a second pedal 173, and a steering column 155 of FIG. 1.

Referring now to FIGS. 2, 7 and 8, the first arm assembly 720 comprises a first frame arm 722 of FIG. 8, a first connecting arm 724 of FIG. 7, a first main arm 226 of FIG. 2, and a first crank arm 228 of FIG. 2. A first end 722A of FIG. 8 of the first frame arm 722 is rotatably attached to a lower member 714 of the frame 710. A first end 724A of the first connecting arm 724 of FIG. 7 is rotatably attached to a second end 722B of FIG. 8 of the first frame arm 722. A first end 226A of FIG. 2 of the first main arm 226 is rotatably attached to a second end 724B of FIG. 7 of the first connecting arm 724. A first end 228A of FIG. 2 of the first crank arm 228 of FIG. 8 is rotatably attached to a second end 226B of FIG. 2 of the first main arm 226.

Referring now to FIGS. 3, 7 and 8, the second arm assembly 820 comprises a second frame arm 822 of FIG. 8, a second connecting arm 824 of FIG. 7, a second main arm 326, and a second crank arm 328. A first end 822A of FIG. 8 of the second frame arm 822 is rotatably attached to a lower member 714 of the frame 710. A first end 824A of FIG. 7 of the second connecting arm 824 is rotatably attached to a second end 822B of FIG. 8 of the second frame arm 822. A first end 326A of FIG. 3 of the second main arm 326 is rotatably attached to a second end 824B of the second connecting arm 824. A first end 328A of FIG. 3 of the second crank arm 328 is rotatably attached to a second end 326B of FIG. 3 of the second main arm 326.

In examples of the present disclosure, referring now to FIGS. 7 and 8, the first arm assembly 720 further comprises a first roller track assembly 773. The first roller track assembly 773 comprises a first guide member 775 comprising a first arc slot 777 and a first roller 779 of FIG. 8. The first roller 779 is attached to the first connecting arm 724. The first roller 779 is operative to move along the first arc slot 777.

In examples of the present disclosure, referring now to FIGS. 7 and 8, the second arm assembly 820 further comprises a second roller track assembly 873. The second roller track assembly 873 comprises a second guide member 875 comprising a second arc slot 877 and a second roller 879. The second roller 879 is attached to the second connecting arm 824. The second roller 879 is operative to move along the second arc slot 877.

In examples of the present disclosure, the frame 710 comprises an upper member 712 and a lower member 714. The first roller track assembly and the second roller track assembly are attached to the lower member 714 of the frame 710.

Figure 9:
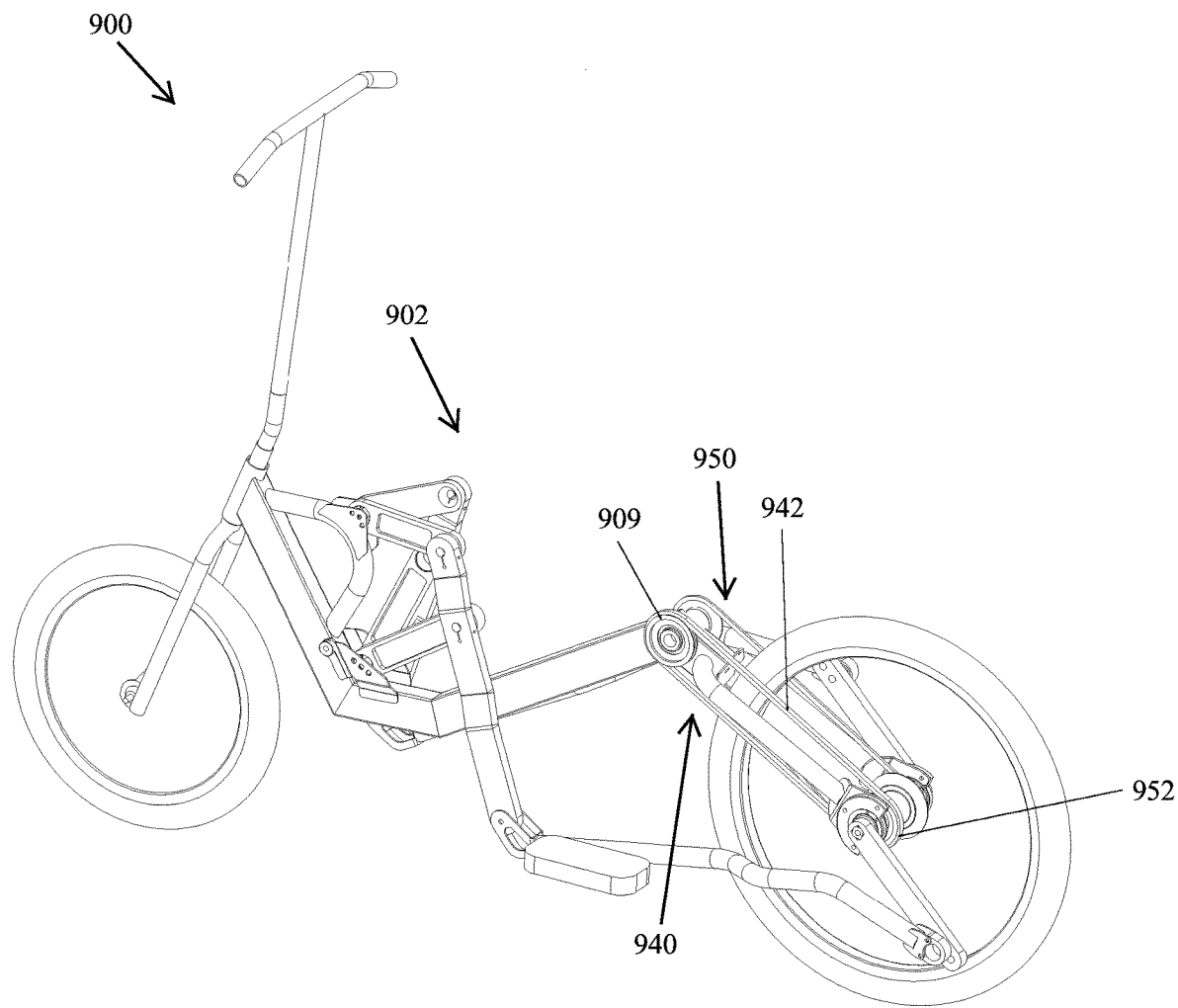
FIG. 9 is a perspective view of still another bicycle including a drive system in examples of the present disclosure.

FIG. 9 shows a bicycle 900 comprising a drive system 902 in examples of the present disclosure. Referring now to FIGS. 1-5 and 9, in examples of the present disclosure, the first chain assembly 240 of FIGS. 1-5 is replaced by a cog belt assembly 940 of FIG. 9, the first chain 403 is replaced by a cog belt 942, the first drive sprocket 408 is replaced by the first drive sprocket 952, and the first driven sprocket 409 is replaced by a first driven sprocket 909. A left foot of a rider steps on the first pedal 171. A right foot of a rider steps on the second pedal 173. Motion of the first pedal 171 drives the first arm assembly 220. Motion of the second pedal 173 drives the second arm assembly 320. Motion of the first arm assembly 220 and motion of the second arm assembly 320 drive the cog belt assembly 940. Motion of the cog belt assembly 940 drives a chain assembly 950 (similar to the second chain assembly of 340 of FIG. 3).

Motion of the first crank arm 228 and motion of the second crank arm 328 drive the crank shaft 162 and the first drive sprocket 952. Motion of the first drive sprocket 952 drives the cog belt 942. Motion of the cog belt 942 drives the first driven sprocket 909. Motion of the first driven sprocket 909 drives the cross shaft 172 and the second drive sprocket 438. Motion of the second drive sprocket 438 drives the second chain 433. Motion of the second chain 433 drives the cluster 432. Motion of the cluster 432 drives the hub 411.

Those of ordinary skill in the art may recognize that modifications of the embodiments disclosed herein are possible. For example, a shape of the frame 110 of a shape of the frame 710 may vary. Other modifications may occur to those of ordinary skill in this art, and all such modifications are deemed to fall within the purview of the present invention, as defined by the claims.

The invention claimed is:

1. A drive system comprising:
a frame;
a first extension member attached to the frame;
a second extension member attached to the frame;
a first arm assembly disposed on a first side of the frame, the first arm assembly comprising:
a first frame arm, a first end of the first frame arm being rotatably attached to the frame;
a first connecting arm, a first end of the first connecting arm being rotatably attached to a second end of the first frame arm;
a first main arm, a first end of the first main arm being rotatably attached to a second end of the first connecting arm; and
a first crank arm, a first end of the first crank arm being rotatably attached to a second end of the first main arm;
a second arm assembly disposed on a second side of the frame opposite the first side of the frame, the second arm assembly comprising:
a second frame arm, a first end of the second frame arm being rotatably attached to the frame;
a second connecting arm, a first end of the second connecting arm being rotatably attached to a second end of the second frame arm;
a second main arm, a first end of the second main arm being rotatably attached to a second end of the second connecting arm; and
a second crank arm, a first end of the second crank arm being rotatably attached to a second end of the second main arm;
a first chain assembly; and
a second chain assembly;
wherein the first arm assembly and the second arm assembly drive the first chain assembly; and
wherein the first chain assembly drives the second chain assembly.

2. The drive system of claim 1, wherein the first chain assembly is disposed on the second side of the frame; and
wherein the second chain assembly is disposed on the first side of the frame.

3. The drive system of claim 1, wherein the first chain assembly is disposed on the first side of the frame; and
wherein the second chain assembly is disposed on the second side of the frame.

4. The drive system of claim 1 further comprising
a crank shaft;
a hub;
a bearing between the crank shaft and the hub; and
a cross shaft rotatably attached to the frame;
wherein the first chain assembly comprises
a first drive sprocket rigidly attached to the crank shaft;
a first chain driven by the first drive sprocket; and
a first driven sprocket driven by the first chain, the first driven sprocket being rigidly attached to the cross shaft;
wherein the second chain assembly comprises
a second drive sprocket rigidly attached to the cross shaft, the first driven sprocket driving the cross shaft and the second drive sprocket;
a second chain driven by the second drive sprocket;
a cluster mounted to the second extension member, the cluster being driven by the second chain, the cluster driving the hub; and
a chain derailleur mounted to the second extension member;
wherein a second end of the first crank arm is rigidly attached to a first end of the crank shaft;
wherein a second end of the second crank arm is rigidly attached to a second end of the crank shaft; and
wherein the first crank arm and the second crank arm drive the crank shaft and the first drive sprocket.

5. The drive system of claim 4 further comprising
a first pedal rotatably attached to the first main arm; and
a second pedal rotatably attached to the second main arm.

6. The drive system of claim 5 further comprising a steering column rotatably attached to the frame.

7. The drive system of claim 5, wherein the first arm assembly further comprises a first track arm connecting the first connecting arm to the frame; and
wherein the second arm assembly further comprises a second track arm connecting the second connecting arm to the frame.

8. The drive system of claim 7, wherein the frame comprises
a main body;
a V-shape member attached to the main body;
a first panel attached to the V-shape member; and
a second panel attached to the V-shape member;
wherein the first end of the first frame arm is rotatably attached to the first panel of the frame; and
wherein the first end of the second frame arm is rotatably attached to the second panel of the frame.

9. The drive system of claim 5, wherein the first arm assembly further comprises a first roller track assembly comprising
a first guide member comprising a first arc slot; and
a first roller attached to the first connecting arm, the first roller operative to move along the first arc slot; and wherein the second arm assembly further comprises a second roller track assembly comprising a second guide member comprising a second arc slot; and a second roller attached to the second connecting arm, the second roller operative to move along the second arc slot.

10. The drive system of claim 9, wherein the frame comprises an upper member and a lower member; and wherein the first roller track assembly and the second roller track assembly are attached to the lower member of the frame.

11. A drive system comprising:

a frame;

a first extension member attached to the frame;

a second extension member attached to the frame;

a first arm assembly disposed on a first side of the frame, the first arm assembly comprising:

a first frame arm, a first end of the first frame arm being rotatably attached to the frame;

a first connecting arm, a first end of the first connecting arm being rotatably attached to a second end of the first frame arm;

a first main arm, a first end of the first main arm being rotatably attached to a second end of the first connecting arm; and a first crank arm, a first end of the first crank arm being rotatably attached to a second end of the first main arm;

a second arm assembly disposed on a second side of the frame opposite the first side of the frame, the second arm assembly comprising:

a second frame arm, a first end of the second frame arm being rotatably attached to the frame;

a second connecting arm, a first end of the second connecting arm being rotatably attached to a second end of the second frame arm;

a second main arm, a first end of the second main arm being rotatably attached to a second end of the second connecting arm; and a second crank arm, a first end of the second crank arm being rotatably attached to a second end of the second main arm;

a cog belt assembly; and a chain assembly;

wherein the first arm assembly and the second arm assembly drive the cog belt assembly; and wherein the cog belt assembly drives the chain assembly.

12. The drive system of claim 11 further comprising a crank shaft;

a hub;

a bearing between the crank shaft and the hub; and a cross shaft rotatably attached to the frame;

wherein the cog belt assembly comprises a first drive sprocket rigidly attached to the crank shaft;

a cog belt driven by the first drive sprocket; and a first driven sprocket driven by the cog belt, the first driven sprocket being rigidly attached to the cross shaft;

wherein the chain assembly comprises a second drive sprocket rigidly attached to the cross shaft, the first driven sprocket driving the cross shaft and the second drive sprocket;

a chain driven by the second drive sprocket;

a cluster mounted to the second extension member, the cluster being driven by the chain, the cluster driving the hub; and a chain derailleur mounted to the second extension member;

wherein a second end of the first crank arm is rigidly attached to a first end of the crank shaft;

wherein a second end of the second crank arm is rigidly attached to a second end of the crank shaft; and wherein the first crank arm and the second crank arm drive the crank shaft and the first drive sprocket.

* * * * *